United States Patent

[11] 3,607,985

| [72] | Inventors | Robert Edward Tarney<br>Chadds Ford, Pa.;<br>John J. Verbanc, Wilmington, Del. |
|---|---|---|
| [21] | Appl. No. | 771,996 |
| [22] | Filed | Oct. 30, 1968 |
| [45] | Patented | Sept. 21, 1971 |
| [73] | Assignee | E. I. du Pont de Nemours and Company<br>Wilmington, Del. |

[54] ELASTOMER HAVING IMPROVED BUILDING TACK
10 Claims, No Drawings

[52] U.S. Cl....................................................... 260/889,
156/128, 161/232, 260/23.7 M, 260/29.3,
260/33.6 AQ, 260/41 R, 260/47 UP, 260/80.7,
260/80.78, 260/82, 260/85.3
[51] Int. Cl........................................................ C08d 9/08
[50] Field of Search.......................................... 260/80.7,
889

[56] References Cited
UNITED STATES PATENTS

| 3,380,952 | 4/1968 | Cluff et al..................... | 260/889 |
| 3,408,253 | 10/1968 | Eckert et al. ................ | 260/889 |
| 3,491,167 | 1/1970 | Soldatos....................... | 260/889 |
| 3,509,239 | 4/1970 | Tindall ......................... | 260/889 |

FOREIGN PATENTS

| 826,292 | 12/1959 | Great Britain................ | 260/82.1 |
| 1,062,266 | 3/1967 | Great Britain................ | 260/80.7 |

OTHER REFERENCES
Wing-Tack Bulletin, Good Year Tire & Rubber Co. Note: (no copy need be sent to applicant)

Primary Examiner—Samuel H. Blech
Attorney—Raymond E. Blomstedt

ABSTRACT: An EDODM elastomer is tackified by uniformly mixing with a hydroxylated, carboxylated or phenolated isoprenoidal resin formed by copolymerization of isoprene with piperylene.

ELASTOMER HAVING IMPROVED BUILDING TACK

BACKGROUND OF THE INVENTION

Synthetic rubberlike polymers are notably deficient in building tack, which is the surface property of natural rubber which enables two pieces of unvulcanized stock to adhere when brought into contact under moderate pressure. Surprisingly enough this characteristic is peculiar to two pieces of natural rubber and neither will adhere to other substances in a like manner; for example, such adhesion does not exist between natural rubber and metal, glass or wood. Unfortunately synthetic rubberlike polymers do not exhibit good building tack and the various means heretofore devised to overcome this deficiency, including the addition of natural rubber, synthetic resins or natural products such as rosins or gums during the compounding operation are not satisfactory. Prior attempts to improve building tack of elastomers generally and EPDM elastomers in particular have concentrated upon use of one or more adhesive layers to hold the polymer layers together in a sandwichlike structure. There has been a need for a means for improving the building tack of elastomers without any need to resort to stratified structures or the additional step, inherent in making such structures, of coating adhesive on the layers to be adhered.

THE INVENTION

In accordance with this invention an EODM elastomer is provided with excellent building tack by uniformly mixing with about 10%–40% by weight isoprenoidal resin which has been modified by the addition of phenolic, hydroxyl or carboxyl groups. The isoprenoidal resin, prior to modification, is a polymer of isoprene and piperylene which can, if desired, be further reacted, prior to said modification, with an allylically terminated ethylenically unsaturated cyclic compound. In the latter case the proportion of polymer units to terminated cyclic units in the reaction product is about 50%–95% by weight.

DETAILS OF THE INVENTION

The term "building tack" (sometimes referred to herein simply as "tack") is used herein with its usual meaning as the peculiar characteristic of natural rubber which causes two fresh surfaces to adhere or coalesce. The amount of tack which an elastomer has is determined by a so-called "peel test" or "repeat test" described hereinafter.

The modified isoprenoidal resins of this invention are prepared by hydroxylating, carboxylating or phenolating a polymer (codimer) formed by polymerizing isoprene with piperylene. The unmodified polymer can be reacted, prior to modification, with an allylically terminated, ethylenically unsaturated cyclic compound in the presence of aluminum chloride or other Friedel-Crafts catalyst. The allylically terminated cyclic compound can in turn be made by reaction of a cyclopentadiene such as dicyclopentadiene with a terminator such as alpha-methyl styrene or 2-methyl-2-butene. Although the cyclopentadiene compound and terminator can be prereacted before admixing with the codimer, it is preferred to simply admix the codimer, terminator and cyclopentadiene with aluminum chloride and then heat the mixture. The cyclopentadiene compound and terminator should be present in about equal amounts by weight or the terminator should be in excess.

Cyclopentadiene itself as well as dicyclopentadiene can be utilized as the cyclic compound and other ethylenically unsaturated cyclic compounds which behave like dicyclopentadiene can also be used, such as 5-methylene-2-norbornene and 5-ethylidene-2-norbornene and the like.

Olefins, particularly monoolefins with internal double bonds such as 2-butene, 2-pentene, 2-hexene, 3-hexene, 2-heptene, 3-heptene and the like can be used as terminators as well as substituted derivatives of alpha-methyl styrene in which the substituents do not interfere with the reaction described. Other similarly reacting materials which provide allylic termination of the unsaturated cyclic compound can also be used.

A convenient source of the raw materials utilized to produce the isoprenoidal resin utilized in this invention is the unsaturated hydrocarbon stream from a hydrocarbon cracking process used to make gasoline. Such a stream contains numerous olefins and unsaturated cyclic compounds such as isoprene, piperylene, 2-methyl-2-butene, cyclopentadiene, dicyclopentadiene and the like. Conveniently such a stream is utilized by simply adjusting the content of ethylenically unsaturated cyclic compound and/or terminator therein by addition of one or the other or both thereto as necessary so that the cyclic compound and terminator are in about equal weight proportions and have a combined weight equal to 5%–50% of the total weight of the composition, preferably 5%–20% on that basis. The mixture is then heated at elevated temperature preferably in the range of about 50 to 90° C. in the presence of aluminum chloride to effect codimerization of isoprene and piperylene and polymerization thereof with the allylically terminated ethylenically unsaturated cyclic compounds simultaneously produced in situ. Thus the isoprenoidal resin can be produced in a single process step by simply heating a mixture containing isoprene, piperylene, ethylenically unsaturated cyclic compound and terminator in the presence of a Friedel-Crafts catalyst.

Hydroxylation, carboxylation or phenolation of isoprenoidal resins to produce the modified isoprenoidal resins useful in this invention is accomplished by conventional procedures for reacting compounds containing ethylenic double bonds with hydroxyl, carboxyl and phenolic compounds to add one or more hydroxyl, carboxyl or phenolic groups across the double bond. Thus, reaction of the unmodified resin with performic acid adds a hydroxyl substituent to each carbon adjacent to the double bond and a similar reaction with boron hydride adds a hydroxyl group to one of these carbon atoms. Carboxylation and phenolation are also effected by well-known procedures, using carboxyl-forming compounds and phenolic compounds, respectively, the latter including phenols, resorcinol and similar aromatic hydroxy compounds.

The modified resin need not be a completely modified resin, which is to say that all the ethylenic double bonds of the unmodified resin need not be reacted with the hydroxyl, phenolic or carboxy compound as the case may be. Actually a small amount of modification is acceptable in some cases; as little as 1% by weight of phenol groups based on the weight of resin provides adequate tack and 30% by weight can also be used. A similar small proportion of hydroxyl or carboxyl groups is sufficient to provide the advantages of this invention, or up to and including a 100% hydroxylated resin can be used. A 100% hydroxylated or carboxylated resin is one in which all or practically all of the ethylenic double bonds is replaced by hydroxyl or carboxyl groups, respectively.

The isoprenoidal resin tackifier of this invention is incorporated into sulfur curable elastomers in amounts of about 10–40 phr. and preferably in an amount of 15–25 phr. for tire use. For nontire use (e.g., belts and molded shoes) the amount of resin is adjusted for the tack level and properties desired. It is desirable to use as little tackifier as will provide the desired tack for economic reasons and to avoid adverse affects on curability of the polymer.

The invention is particularly useful for imparting tack to sulfur curable synthetic elastomers of EODM polymers, that is, polymers of ethylene, another alpha-olefin (preferably $C_3$–$C_6$) and a diene, preferably a nonconjugated diene having only one readily polymerizable double bond. Particularly preferred are polymers of ethylene, propylene and a nonconjugated diene (called EPDM polymers), the diene containing 6–22 carbon atoms and having only one polymerizable double bond. An EPDM polymer which is especially preferred is the terpolymer of ethylene/propylene/1,4-hexadiene, but ethylene/propylene/dicyclopentadiene, ethylene/propylene/ethylidene norbornene and ethylene/propylene/methylene-2-norbornene terpolymers are also very useful. Other representative useful sulfur-curable terpolymer elastomers are those described in U.S. Pat. Nos. 3,093,620, 3,063,973 and 2,933,480.

The compositions of the present invention are made by mixing the elastomer and modified resin in any convenient manner which will produce a uniform mixture. This can be accomplished by milling on a conventional rubber mill or in a Banbury mixer. Normally the modified resin will exhibit significant affinity for the polymer and this facilitates the mixing which is usually accomplished in a manner of minutes. Conveniently the modified resin can be added to the polymer during the regular compounding operation wherein one or more other additives, curing agents, antioxidants, pigments, etc. are added. The latter are not necessary, however, to gain the advantages of this invention. Curing is effected by conventional methods and under the usual conditions.

One of the benefits of this invention, beyond the development of exceptional building tack in polymers which heretofore have resisted exhibiting this property, is the substantial greater plasticity of the polymer/resin mixture compared to the polymer alone. Compositions used heretofore to impart building tack to EODM polymers have actually reduced plasticity of the polymer and rendered it relatively less workable whereas the present polymer/resin compositions are more workable than the polymer alone. Thus, whereas in the past it has been necessary to plasticize EPDM polymers with oils and other agents to improve polymer workability, the present cyclic resins are plasticizers also.

Comparative plasticities are easily determined by Wallace Plasticity measurements. These are made on a Wallace Plastimeter, manufactured by H. W. Wallace & Company, Ltd., London and is a measure of the amount of flow or deformation under load of unvulcanized elastomeric materials. In this measurement the polymer to be tested is sheeted and cut into pellets having a thickness in the range 125 mils. to 300 mils. Initially, for a 10-second period, the test pellet is compressed to exactly 1 mm. in thickness and is heated to 100° C. Then the test pellet is subjected to a 10-kg. load for exactly 15 seconds at 100° C.

The following examples illustrate the invention. All parts, percentages and proportions are by weight unless otherwise indicated.

EXAMPLE 1

A. Preparation of 30% Hydroxylated Cyclopolyisoprene Resin

An amount of 6 grams of cyclopolyisoprene resin, sold commercially as Wingtack 95 and believed to be a reaction product of isoprene and piperylene having a molecular weight of 1500–2000 and an unsaturation of 1–2 g-mols C=C per kilogram, is dissolved in 600 ml. of heptane under nitrogen, and 10 ml. of a one-molar solution of $BH_3$ in tetrahydrofuran is added. After refluxing for 1.5 hours, the solution is cooled and 10 ml. of 3N NaOH and 10 ml. of 30% $H_2O_2$ are added. The mixture is refluxed for 1.5 hours, cooled and the organic layer separated, filtered and concentrated by pan evaporation. The hydroxylated product contains 0.4 milliequivalents OH/gram.

B. Use of 30% Hydroxylated Cyclopolyisoprene as an Internal Tackifier in EPHD Elastomer A carcass stock A is compounded on a rubber roll mill using conventional techniques according to the formulations given below. In addition, for purposes of comparison, two stocks, B and C, outside the scope of this invention are compounded in the same way except that the hydroxylated modified cyclopolyisoprene resin is replaced by unmodified cyclopolyisoprene in stock B and by naphthenic petroleum oil in stock C.

EPHD elastomer A is a 52/44/4 (weight per cent) ethylene/propylene/1,4-hexadiene terpolymer having a Mooney viscosity (ML-4/250° F.) of 70, and made by polymerizing the monomers with a premixed $VOCl_3$/diisobutyl aluminum chloride catalyst in tetrachloroethylene.

| Component | Stock A | B* | C* |
|---|---|---|---|
| EPHD Elastomer A | 100 | 100 | 100 |
| High abrasion furnace carbon black | 80 | 80 | 80 |
| Naphthenic petroleum oil | 10 | 10 | 50 |
| 30% Hydroxylated cyclopolyisoprene resin | 40 | 0 | 0 |
| Unmodified cyclopolyisoprene resin | 0 | 40 | 0 |
| ZnO | 5 | 5 | 5 |
| Sulfur | 1.5 | 1.5 | 1.5 |
| Zinc dibutyl dithiocarbamate | 1.5 | 1.5 | 1.5 |
| Tetramethyl thiuram disulfide | 0.5 | 0.5 | 0.5 |
| 2-Mercaptobenzothiazole | 0.75 | 0.75 | 0.75 |

*Outside the invention

The following table shows the resin content of each stock and the resulting peel strength:

| Stock | A | B* | C* |
|---|---|---|---|
| 30% Hydroxylated cyclopolyisoprene resin (phr.)** | 40 | 0 | 0 |
| Unmodified cyclopolyisoprene resin (phr.) | 0 | 40 | 0 |
| Peel (lbs./linear inch) | 13.2 | 4.95 | 1.4 |

*Outside the invention
**phr. = parts resin per hundred parts elastomer

The tables show that the hydroxylated resin is much more effective than the unmodified resin for conferring tack; moreover, stock A cured suitably in 30 minutes at 160° C., as did Control C having no tackifier. Stock B, while tacky, is of little value because the high concentration of unmodified resin makes an adequate cure very difficult or impossible with this recipe.

PEEL TACK

Test samples are formed by pressing a 6×3×0.75 inch sheet of elastomeric material (e.g., Formulas A–E) between a cotton duck backing and a polyethylene terephthalate film, to embed the cotton duck in one face, using a laboratory compression molding press, with mild pressure at a temperature of 212° F. for three minutes. Test strips one-fourth inch wide are cut from the backed sheet, the film is removed, and pairs are joined by placing the elastomeric surfaces together and rolling with an 8 pound weight. 30 seconds after joining the strips they are pulled apart in a Tensile testing machine at a draw rate of 5/2 inches/minute at 25° C. (68° F.). The peel strength is recorded in pounds per linear inch.

REPEAT TACK

A second method of measuring tack is designed to simulate the conditions encountered in automatic tire building equipment. Specimens are cut from either (a) the carcass fabric in 1 ×½ inch strips with the cords parallel to the long axis or (b) from fabric constructed as described under the peel tack test. One piece is mounted vertically on the face of a fixed metal block. The other piece is mounted horizontally across a similar block which can be driven into contact with the first block by an air activated cylinder. When the faces of the pieces are contacted, the contact force is measured by the pressure applied to the air cylinder. The time of contact is determined by a timing mechanism which can be set for an interval of 0.8 to 15 seconds. The air cylinder is removed at 40 p.s.i. providing a break time of about 40 milliseconds. Tack is determined as the instantaneous breaking force measured by a load-cell transducer, and a high speed recorder. The contact time, the contact pressure and the breaking force are recorded. Specific data showing the efficacy of the composition of this invention are recorded in the Tables.

EXAMPLE 2

A. Preparation of 100% Hydroxylated Cyclopolyisoprene Resin

A solution of 200 grams of cyclopolyisoprene resin, sold as Wingtack 95, in 1500 ml. of heptane is treated under nitrogen over a 60-minute period by addition of 60 ml. of a one-molar tetrahydrofuran solution in $BH_3$. After 2 hours reflux, it is cooled to about 60° C. and 40 ml. more of the $BH_3$ solution is added. The mixture is heated and kept at reflux for another 30 minutes. Slowly, 100 ml. 3N NaOH is added, followed by 100 ml. 30% $H_2O_2$; each reaction is exothermic. When refluxing subsides, the solution is stirred until it cools to room temperature and then washed well with water and concentrated by evaporation in a pan. The IR shows a strong peak at 3.0 microns (OH band) and the C=C bond at 10.37 has become negligible.

B. Use of Hydroxylated Cyclopolyisoprene as an Internal Tackifier in EPHD Copolymer Rubber Four carcass stocks (A, B, C and D) are compounded on a rubber roll mill at about 24°–38° C. according to the formulation given below. In addition, for purpose of comparison, one stock (E) outside the scope of the invention is compounded in the same way as stock A except that no hydroxyl-modified cyclopolyisoprene resin is added.

| Component | Parts by Weight |
| --- | --- |
| EPHD Elastomer | 100 |
| High abrasion furnace carbon black | 80 |
| Naphthenic petroleum oil | 47.5 for A, E; 40 for B, C, D |
| Zinc oxide | 5 |
| Hydroxylated resin | (see below) |
| Sulfur | 1.5 |
| Zinc dibutyl dithiocarbamate | 1.5 |
| Tetramethyl thiuram disulfide | 0.5 |
| 2-Mercaptobenzothiazole | 0.75 |

Repeat tack measurements are made on stocks A–E. The contact time is 1 second and the contact force 80 p.s.i.

REPEAT TACK

| Stock | Hydroxylated cyclopolysoprene resin (phr.) | Breaking force (p.s.i.) after— | | |
| --- | --- | --- | --- | --- |
| | | 1st contact | 2d contact | 3rd contact |
| A | 20 | 61 | 54 | 52 |
| B | 30 | 121 | 97.6 | 84.8 |
| C | 40 | [1] >116 | 88.4 | 63.6 |
| D | 50 | 110 | [1] >118 | 96 |
| E [2] | 0 | 37 | 33 | 35 |

[1] Pulled from jaws during the test.
[2] Outside invention.

Stocks A–E, after curing for 30 minutes at 160° C., provide the following vulcanizate data:

VULCANIZATE PROPERTIES (AT 25° C.)

| Stock | Pounds per square inch | | | | Percent | |
| --- | --- | --- | --- | --- | --- | --- |
| | $M_{100}$ | $M_{200}$ | $M_{300}$ | $T_B$ | $E_B$ | P.S. |
| A | 125 | 200 | 500 | 2,100 | 670 | 17 |
| B | 100 | 200 | 400 | 1,925 | 700 | 20 |
| C | 100 | 175 | 300 | 1,725 | 740 | 22 |
| D | 75 | 125 | 250 | 1,450 | 790 | 26 |
| E [1] | 200 | 600 | 1,250 | 2,200 | 450 | 6 |

[1] Outside invention.

EXAMPLE 3

A. Preferred Procedure for Making Tacky EPHD Elastomer by Incorporating Hydroxylated Cyclopolyisoprene Resin A masterbatch having the following composition is prepared in a Banbury mixer:

| Component | Parts by Weight |
| --- | --- |
| EPHD Elastomer A | 100 |
| SAF carbon black | 70 |
| Paraffinic petroleum oil (Sunpar 2280) | 40 |
| Hydroxylated cyclopolyisoprene resin | 20 |
| ZnO | 5 |

Mixing times range from 10 to 30 minutes; the dump temperature is 182° C.

Peel adhesion (30 sec.) after one day is 2.6 pli.

The masterbatch is transferred to a hot (93° C.) rubber roll mill, blended and further compounded with the following:

| Component | Parts by Weight |
| --- | --- |
| Sulfur | 1.5 |
| Zinc dibutyl dithiocarbamate | 1.5 |
| 2-Mercaptobenzothiazole | 0.75 |
| Tetramethyl thiuram disulfide | 0.5 |

The resulting friction stock is then applied, one side at a time, to treated nylon carcass fabric at the rate of about 3 feet per minute on a 3-roll calender with rolls at 93° C. The nylon fabric had been treated with a latex containing resorcinol/formaldehyde resin and chlorosulfonated polyethylene prepared as follows: 321 parts of 20% latex of chlorosulfonated polyethylene are added to a solution of 12.5 parts of resorcinol and 14.22 parts of 37% formaldehyde in 62.5 parts of water; more water is added to give 383.5 parts total, and the pH is adjusted to 7.5 with 10% aqueous NaOH solution. After the dip has aged for one day at 30° C., the nylon is coated and oven dried for 0.8 minute at 229° C.

The nylon plies obtained are used to make a tire carcass on a National Rubber Machine Company model 80 Building Drum. An inner liner consisting of a blend of 80 parts chlorinated butyl rubber and 20 parts of EPHD Elastomer compounded with carbon black and curing agents is laid down first. After the plies are laid down and the beads set, the ply ends are turned up automatically. Tread stock made from EPHD Elastomer rubber, carbon black, and a sulfur curing system is then applied. The green tire is cured in a "Bag-O-Matic" press to give a tubular pneumatic tire.

EXAMPLE 4

A. Preparation of Glycol Modified Cyclopolyisoprene Resin

A solution of 1000 grams of cyclopolyisoprene resin in 1500 milliliters of hexane is added over a 30–40 minute period to a well agitated mixture of 1000 milliliters of 98% aqueous formic acid (22.6 g-mols) and 300 milliliters (3-g-mols) of 30% aqueous hydrogen peroxide at 50°–60° C. in a 5-liter, 4-neck glass flask having a stop-cock at the bottom and fitted with a thermometer, a condenser, a dropping funnel, and a shaft stirrer. When the addition is finished, stirring is continued until the temperature has dropped to 25° C. The aqueous lower layer is discarded. A solution of 120 grams (3 g-mols) of sodium hydroxide in 200 milliliters of water is added while good agitation is maintained and the temperature is kept between 45° and 50° C. When the mixture has cooled to room temperature, the aqueous lower layer is discarded and the organic layer is washed with water until neutral. Solvent evaporation gives a glycol-modified cyclopolyisoprene resin displaying IR absorption at 2.95 microns (OH) and transparent at 10.37 microns (showing absence of trans C=C).

B. Preparation of Phenolated Cyclopolyisoprene Resin

A 250-milliliter round-bottom glass flask equipped with a magnetic stirrer, a thermometer, a condenser, and a gas inlet is charged under nitrogen at room temperature (about 25° C.) with 100 milliliters of hexane, 25 grams of cyclopolyisoprene, 15 grams of aluminum trichloride and 5 grams of resorcinol. After the mixture has been agitated at room temperature, it becomes bright red. Water and hydrochloric acid are added, in turn, while ice bath cooling is applied. The hexane layer is separated, washed repeatedly with dilute hydrochloric acid, and concentrated to dryness by evaporation (finally in a vacuum oven). The resorcinolated cyclopolyisoprene resin obtained appears to soften between 85° and 90° C. The IR of the product shows characteristic resorcinol bands at 3.1 microns (OH) and 6.3 microns (aromatic ring).

C. Preparation of Carboxylated Cyclopolyisoprene Resin

A solution of 100 grams of cyclopolyisoprene in 500 milliliters of hexane is slowly added under nitrogen to a well agitated mixture of 200 grams of concentrated sulfuric acid and 5 milliliters of 98% formic acid at 0°–5° C. in a 1-liter, 4-neck glass flask equipped with a thermometer, a condenser, a dropping funnel and a shaft stirrer. A 35-gram portion of 98% formic acid is then added over a 15-minute period to the resulting red solution while the temperature is kept at 5° C. The mixture is allowed to warm to 25° C. and is stirred at 25° C. for 2 hours. Finally it is poured into 200 grams of ice and stirred well. The water layer is discarded. The organic layer is repeatedly washed with water and saturated aqueous sodium bicarbonate until slightly acidic. Carboxylated cyclopolyisoprene resin is isolated by evaporating volatiles. Typically the product is transparent at 10.37 microns (no trans C=C) and has a strong infra red absorption band at 8.5 microns (C=0). NMR analysis indicates that 0.65 g-mol $CO_2H$/kilogram is present.

D. Properties

The products of A, B and C above have properties similar to those of the hydroxylated resins of Examples 1, 2 and 3.

EXAMPLE 5

Preparation of Carcass Skim Stock

EPHD elastomer B is a 61/36/3 (weight per cent) ethylene/propylene/1,4-hexadiene terpolymer having a Mooney viscosity (ML 4/250° F.) of 40, and made by polymerizing the monomers in tetrachloroethylene in the presence of a coordination catalyst made in situ by combining $VCl_4$ and diisobutyl aluminum monochloride; hydrogen modification is done in accordance with U.S. Pat. No. 3,051,690.

An automobile tire skim stock is compounded by the following steps. A 1130-gram batch without curing agents is mixed according to the formulation below in a water-cooled "B" Banbury:

|  | phr. |
|---|---|
| EPHD Elastomer A | 75 |
| EPHD Elastomer B | 25 |
| ZnO | 5 |
| Stearic acid | 1 |
| Carbon black (HAF)[1] | 80 |
| Paraffinic oil ("Sunpar 2280")[2] | 40 |
| Phenolated resin | 20 |

[1] high structure ("Sterling 105")
[2] Viscosity, SUS at 100°/210° F.—2907/165

Upon discharge from the Banbury, the stock is cooled and compounded with curing agents on a rubber roll mill with the following materials:

|  | phr. |
|---|---|
| Zinc dimethyldithiocarbamate | 1.5 |
| Tetramethyl thiuram disulfide | 1.5 |
| 2,2-Dithiobisbenzothiazole | 0.8 |
| Sulfur ("Crystex 90") | 3 |

The resulting skim stock has the following properties:

| Peel Tack | | |
| Repeat Tack | 2 | p.l.i. |

| Breaking Force (p.s.i.) after number of 1-second contacts indicated: | | |
|---|---|---|
| 1st | 2nd | 3rd |
| 48 | 60 | 92 |

Green strength, which is tensile strength at the break, the sample being elongated at 25° C. at the rate of 20 inches/minute, is 54 p.s.i.

The curing behavior is as follows:

Mooney Scorch (at 250° F.)

| Minimum | 24.5 points |
|---|---|
| Minutes to 5-point rise | greater than 30 |

Vulcanization properties (at 25° C. except as noted) after a 25-minute cure at 330° F. are as follows:

Stress-Strain Characteristics

| Modulus at 100% extension (lbs./sq. in.) | 247 |
|---|---|
| Modulus at 200% extension (lbs./sq. in.) | 630 |
| Modulus at 300% extension (lbs./sq. in.) | 1060 |
| Tensile strength (lbs./sq. in.) | 2200 |
| Elongation at break (%) | 650 |
| Heat Buildup | |
| ΔT (°C.) | 75.5 |
| ΔC (mils) | 39 |
| Final center temperature (C.) | 148 |
| Shore A Hardness | 61 |

The phenolated resin is prepared from an olefin-containing byproduct of a hydrocarbon cracking process by adjusting it to contain about 6% by weight of each of 2-methyl-2-butene and cyclopentadiene with the remainder characterized by substantially equal weight proportions of isoprene and piperylene. The mixture is heated at about 70°–80° C. in the presence of $AlCl_3$ until the resin-forming reaction is substantially completed. Then phenol is added (2% based on the weight of resin) and allowed to react with residual unsaturation. The modified resin is recovered by removing the catalyst with aqueous HCl washes, neutralizing and drying the solution, and distilling the solvent.

We claim:

1. A sulfur curable elastomer of an ethylene/$C_3C_6$ alpha-olefin/nonconjugated diene terpolymer in admixture with about 10%–40% by weight of a hydroxylated or carboxylated polymer of isoprene and piperylene, said polymer containing at least 1% by weight of hydroxyl, or carboxyl groups.

2. The composition of claim 1 in which the elastomer is an ethylene/propylene/nonconjugated diene polymer.

3. The composition of claim 2 in which the elastomer is an ethylene/propylene/1,4-hexadiene polymer.

4. The composition of claim 1 in which the polymer, prior to modification, is reacted with an allylically terminated ethylenically unsaturated cycloaliphatic hydrocarbon compound in an amount to produce a product containing about 50%–95% of said polymer units by weight.

5. The composition of claim 4 in which the cyclic compound is cyclopentadiene.

6. The composition of claim 5 in which the elastomer is ethylene/propylene/1,4-hexadiene polymer.

7. The composition of claim 4 in which the allylically-terminated cyclic compound is the reaction product of cyclopentadiene and 2-methyl butene-2.

8. The composition of claim 7 in which the elastomer is an ethylene/propylene/1,4-hexadiene polymer.

9. The composition of claim 4 in which the allylically-terminated cyclic compound is the reaction product of cyclopentadiene and alpha-methylstyrene.

10. The composition of claim 9 in which the elastomer is an ethylene/propylene/1,4-hexadiene polymer.